(No Model.)
J. J. GORMAN.
FILLING MACHINE FOR CANS, &c.
No. 310,268.  Patented Jan. 6, 1885.
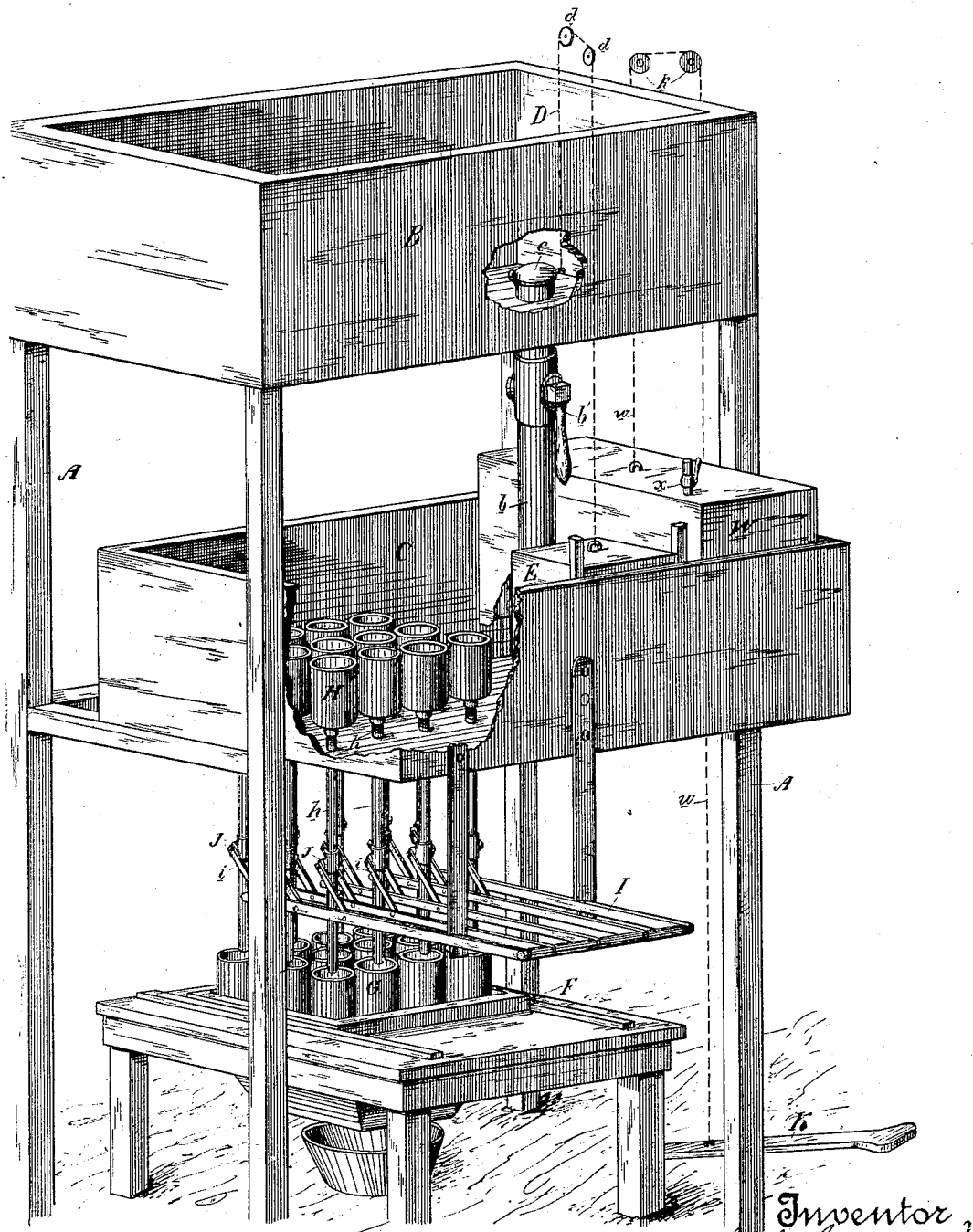
Witnesses,
Geo. H. Strong
J. A. House
Inventor,
J. J. Gorman
By Dewey & Co
attorneys

UNITED STATES PATENT OFFICE.

JAMES JOHN GORMAN, OF TEMESCAL, CALIFORNIA.

FILLING-MACHINE FOR CANS, &c.

SPECIFICATION forming part of Letters Patent No. 310,268, dated January 6, 1885.

Application filed October 9, 1884. (No model.)

*To all whom it may concern:*

Be it known that I, JAMES J. GORMAN, of Temescal, State of California, have invented an Improvement in Filling-Machines for Cans and other Vessels; and I hereby declare the following to be a full, clear, and exact description thereof.

My invention relates to a new and useful filling-machines for cans and other vessels of that class in which the supply for filling the series of vessels is regulated automatically by means of a displacement weight or body; and my invention consists in the arrangement of tanks, measuring-cups, displacement-body, and feed and discharge mechanisms, hereinafter described, together with details of construction.

The object of my invention is to provide a machine which is adapted to provide automatically a supply of liquid, and to feed the supply in stated quantities to the cans or other vessels to be filled.

Referring to the accompanying drawing for a more complete explanation of my invention, the figure is a perspective view of my invention, a portion of the tank C being broken away to show the measuring-cups, and a portion of the displacement-body being broken to show its hollow bottomless character.

A is a frame, in the top of which is mounted the main tank B, below which is the secondary or feed tank C. Between these tanks is the connecting spout or pipe b, opening from the bottom of the main tank and discharging into the tank C near the bottom. In this pipe is a cock, b', for hand use, while on its top is a valve, c, connected with which is a cord, D, passing upward over suitable pulleys, d, and down to a float, E, within the feed-tank.

F is a tray, upon which are set the series of cans G to be filled with the liquid.

Within the tank C are an equal number of measuring-cups, H, having outlet-pipes h extending downwardly through the bottom of the tank and adapted to discharge into the cans G below. The pipes h project above the bottom of tank C a convenient distance to allow of the cups H being screwed or otherwise detachably fastened to them. Each cup, together with that portion of the pipe h above the cock, has a capacity equal to that of the can immediately below. The measuring-cups are easily detached from the pipes h, and when this is done other cups of a different size may be substituted, whereby the quantity of liquid measured may be varied for different-sized vessels to be filled.

I is a hand-lever frame, consisting of a number of longitudinal bars which play past the pipes h, and are connected with the handles i of stop-cocks J in said pipes. The movement of the lever-frame I in one direction opens the stop-cocks J, while its movement in the reverse direction closes them.

Within the tank C is a displacement-body, W, to the top of which is connected a cord, w, passing up over and around suitable pulleys, k, and down to a treadle, K, within reach of the operator.

The operation of the device is as follows: A large quantity of the liquid is contained in the main tank B, from which a portion is allowed to pass down into the feed-tank C (the cocks J being closed) until it reaches a level above the tops of the cups, while the displacement-body rests on the bottom of the tank. The body W is now withdrawn, thereby causing the level of the liquid to fall considerably below the tops of the cups, leaving them full. While the body is so withdrawn the cocks J are simultaneously opened by the lever-frame, allowing the contents of the cups and pipes to drop into the cans beneath. When the level of the liquid falls in the tank C, the float E falls with it, opening the valve c in the main tank and allowing the liquid to pass down through the pipe b into tank C until its level has reached a point immediately below the tops of the cups, at which point (governed by the length of the cord D) the valve c closes, owing to the buoyancy of the float. Meanwhile the liquid in the cups has fallen into the cans on the tray. The cocks J are now closed and the body W allowed to descend, thereby refilling the cups. Its withdrawal leaves them again full for another operation. To accomplish this result the float-connection between the feed-tank C and the main tank B will be accurately adjusted in such a manner that its operation upon the valve c will allow a quantity of liquid to pass into the tank C equal to that drawn off by the overflow into cups H, and will shut it off when the liquid has reached the proper level. The size of the displacement-body W will be such that its operation may have the effect of filling measuring-cups H by its insertion into the tank, and to lower the level of the liquid in said tank to the required distance by its removal.

For the purpose of obtaining a displacement without having too much buoyancy or more weight than is necessary to raise the treadle to its proper position, I construct the displacement-body W in the following manner: It consists of a hollow casing or chamber of any suitable shape and having no bottom. This casing is forced down into the liquid, after the manner of a diving-bell, and the body of air contained within it is let off by means of an outlet controlled by the stop-cock $x$. After the air is thus let off the stop-cock is closed, whereby the chamber W, while having little buoyancy, has still the required displacement.

The whole device is simple in its construction, and may be operated rapidly and with accuracy.

Having thus described my invention, what I claim as new, and desire to secure by Letters Patent, is—

1. In a machine for filling cans or other vessels, a main supply-tank, a secondary or feed tank having independent measuring receptacles or cups within it, adapted to supply the cans or vessels to be filled, a displacement-body and means for raising it from and lowering it into the liquid in the feed-tank, whereby its level is raised to flow over into the measuring-receptacles, and lowered to cut off their supply, a connection between the main tank and feed-tank, and a mechanism operated by the rising or falling level of liquid in the feed-tank to shut off the said connection, or open it to renew the supply, substantially as herein described.

2. In a machine for filling cans or other vessels, a main supply-tank, a secondary or feed tank having the independent measuring receptacles or cups H within it, adapted to supply the cans or vessels to be filled, a displacement-body and means for raising it from and lowering it into the liquid in the feed-tank, whereby its level is raised to flow over into the measuring-cups, and lowered to cut off their supply, the pipe $b$, connecting the main tank with the feed-tank, and the mechanism by which the supply from the main tank is cut off or opened, consisting of the float E in the feed-tank, the cord D, and the valve $c$, governing pipe $b$, substantially as herein described.

3. In a filling-machine for cans or other vessels, the series of measuring-cups H within the feed-tank, adapted to receive their stated supply by the rise of the liquid in said tank, and to discharge it through independent pipes into the series of cans or other vessels below, substantially as herein described.

4. In a machine for filling cans or other vessels, the series of measuring-cups H within the feed-tank, adapted to receive their stated supply by the rise of the liquid in said tank, and to discharge it into the vessels to be filled, said cups being detachable for the substitution of others of different capacity, substantially as and for the purpose herein described.

5. In a machine for filling cans and other vessels, the series of detachable measuring-cups H within the feed-tank, and the discharge-pipes $h$, upon top of which said cups are screwed or otherwise detachably secured, substantially as herein described.

6. In a filling-machine for cans and other vessels, the tank C, and series of measuring-cups H within said tank, adapted to discharge their contents in the series of cans or vessels below, in combination with the displacement-body W, by which the liquid in tank C is caused to overflow into the measuring-cups, substantially as herein described.

7. In a filling-machine for cans and other vessels, the series of discharge-pipes $h$, having cocks J, with handles $i$, in combination with the swinging lever-frame I, secured to said handles, by which the cocks are operated, substantially as herein described.

8. In a machine for filling cans and other vessels, the feed-tank C, having the measuring-cups H, with outlet-pipes $h$, having cocks J, with handles $i$, the displacement-body W, by which the measuring-cups are filled, and the reciprocating lever-frame I, secured to handles $i$, whereby the cocks J are operated, substantially as herein described.

9. In a machine for filling cans and other vessels, the main tank B, feed-tank C, and pipe $b$, between them, having valve $c$, the measuring-cups H in tank C, having outlet-pipes $h$, with governing-cocks, the reciprocating frame I, by which the cocks are operated, the reciprocating displacement-body W in tank C, and the float E therein, connected with valve $c$, all arranged and operating substantially as herein described.

10. In a filling-machine for cans and other vessels, the hollow bottomless displacement body or casing W, having an air-outlet in its top governed by a cock, substantially as and for the purpose herein described.

In witness whereof I have hereunto set my hand.

JAMES JOHN GORMAN.

Witnesses:
C. M. BURLESON,
S. A. SNYDER.